US010403019B2

(12) United States Patent
Levin

(10) Patent No.: US 10,403,019 B2
(45) Date of Patent: Sep. 3, 2019

(54) MULTI-CHANNEL TRACKING PATTERN

(71) Applicant: LUCASFILM ENTERTAINMENT COMPANY LTD., San Francisco, CA (US)

(72) Inventor: John Levin, Mill Valley, CA (US)

(73) Assignee: LUCASFILM ENTERTAINMENT COMPANY, San Francisco, CA (US)

( * ) Notice: Subject to any disclaimer, the term of this patent is extended or adjusted under 35 U.S.C. 154(b) by 210 days.

(21) Appl. No.: 15/041,946

(22) Filed: Feb. 11, 2016

(65) Prior Publication Data

US 2017/0178382 A1 Jun. 22, 2017

Related U.S. Application Data

(60) Provisional application No. 62/268,450, filed on Dec. 16, 2015.

(51) Int. Cl.

| | |
|---|---|
| ***G06T 13/80*** | (2011.01) |
| ***H04N 5/222*** | (2006.01) |
| ***G03B 15/16*** | (2006.01) |
| ***G06K 9/00*** | (2006.01) |
| ***G06K 9/46*** | (2006.01) |

(Continued)

(52) U.S. Cl.

CPC .............. *G06T 13/80* (2013.01); *G06F 3/017* (2013.01); *G06K 9/00342* (2013.01); *G06K 9/00369* (2013.01); *G06K 9/4652* (2013.01); *G06T 7/246* (2017.01); *G06T 7/248* (2017.01); *G06T 7/285* (2017.01); *G06T 7/73* (2017.01); *G06T 7/90* (2017.01); *H04N 5/222* (2013.01); *H04N 5/23229* (2013.01); *G03B 15/16* (2013.01); *G06K 2009/3225* (2013.01); *G06T 2207/10016* (2013.01); *G06T 2207/10024* (2013.01);

(Continued)

(58) Field of Classification Search

CPC ......... G06T 13/80; G06T 7/246; G06T 7/285; G06T 7/73; G06T 7/90; G06T 7/248; G06T 7/0042; G06K 9/00342; G06K 9/00348; G06K 9/00369; G06K 9/4652; H04N 5/222; H04N 5/23229

USPC .......................................................... 348/135

See application file for complete search history.

(56) References Cited

U.S. PATENT DOCUMENTS

2003/0076980 A1 4/2003 Zhang et al.
2004/0155962 A1* 8/2004 Marks ..................... G06T 7/248 348/169

(Continued)

OTHER PUBLICATIONS

"Motion capture—Wikipedia", Available at URL:https://en.wikipedia.org/w/index.php?title=Motion_capture&oldid=695200122, Dec. 14, 2015, pp. 1-12.

(Continued)

*Primary Examiner* — William C Vaughn, Jr.
*Assistant Examiner* — Jae N Noh
(74) *Attorney, Agent, or Firm* — Kilpatrick Townsend & Stockton LLP

(57) ABSTRACT

A multi-channel tracking pattern is provided along with techniques and systems for performing motion capture using the multi-channel tracking pattern. The multi-channel tracking pattern includes a plurality of shapes having different colors on different portions of the pattern. The portions with the unique shapes and colors allow a motion capture system to track motion of an object bearing the pattern across a plurality of video frames.

18 Claims, 8 Drawing Sheets

(Continued)

(3 of 8 Drawing Sheet(s) Filed in Color)

(51) Int. Cl.

| | |
|---|---|
| ***H04N 5/232*** | (2006.01) |
| ***G06T 7/73*** | (2017.01) |
| ***G06T 7/246*** | (2017.01) |
| ***G06T 7/285*** | (2017.01) |
| ***G06T 7/90*** | (2017.01) |
| ***G06F 3/01*** | (2006.01) |
| *G06K 9/32* | (2006.01) |

(52) U.S. Cl.
CPC ............... *G06T 2207/30196* (2013.01); *G06T 2207/30204* (2013.01)

(56) References Cited

U.S. PATENT DOCUMENTS

2012/0268491 A1 10/2012 Sugden et al.
2013/0016876 A1* 1/2013 Wooley .................. G06F 3/011 382/103
2015/0077418 A1 3/2015 Davidson et al.
2015/0302609 A1* 10/2015 Rotella .................... H04N 7/18 348/135
2015/0339805 A1* 11/2015 Ohba ...................... G06F 3/011 345/156
2016/0171330 A1* 6/2016 Mentese .............. G06K 9/3233 348/170
2017/0323062 A1* 11/2017 Djajadiningrat ........ G06F 19/34

OTHER PUBLICATIONS

"Tracking Yellow Color—File Exchange—MATLAB Central", 2011, 2 pages.
PCT/US2016/065411, "International Search Report and Written Opinion", Mar. 23, 2017, 13 pages.
Walters, "ChromaTags: An Accurate, Robust, and Fast Fiducial System", Available at URL:http://web.archive.org/web/20151108004034/_http://austingwalters.com/chromatags/, 2015, pp. 1-9.

* cited by examiner

300

300

MULTI-CHANNEL TRACKING PATTERN

CROSS-REFERENCE TO RELATED APPLICATIONS

This application claims the benefit of U.S. Provisional Application No. 62/268,450, filed Dec. 16, 2015, entitled "Multi-Channel Tracking Pattern," which is hereby incorporated by reference, in its entirety.

FIELD

The present disclosure generally relates to motion capture. For example, a multi-channel tracking pattern is provided, along with systems and techniques for performing motion capture using the multi-channel tracking pattern.

BACKGROUND

Motion capture is an approach for generating motion data that is based on tracking and recording the movement of real objects. One common application of motion capture is in animation, where a realistic sequence of motion (e.g., by a human actor or other object) can be captured and used to represent the motion of an animated object.

SUMMARY

In some examples provided herein, a multi-channel tracking pattern is provided that allows motion tracking to be performed. The multi-channel tracking pattern includes a plurality of shapes having different colors on different portions of the pattern. The portions with the unique shapes and colors allow a motion capture system (or tracking system) to track motion of an object bearing the pattern across a plurality of video frames. The pattern can take the form of makeup, a support structure (e.g., a bodysuit and/or a set of bands), or other articles worn by the object.

The multi-channel tracking pattern allows a motion capture system to efficiently and effectively perform object tracking. In some embodiments, the pattern is track-able over multiple different channels (e.g., over multiple color channels and/or multiple shape channels). For example, a respective color channel can be isolated for each of the colors on the pattern. Isolating the color channel of a color allows a motion capture system to identify the color in the presence of imperfections in an image of a video sequence (e.g., motion blur or other image imperfection). The isolated color can be used to identify positions of a portion of the object being tracked over various images of the video sequence. Because the pattern is designed to be tracked over multiple different channels, a motion capture system can efficiently and effectively determine the position of an object in a video sequence (a series of images) that exhibits motion blur or other imperfection in one or more images of the video sequence. For example, motion blur in an image may make it difficult for certain shapes of a pattern to be detected. However, the motion blur may not affect the track-ability of the colors of the pattern. Thus, a target bearing a pattern that includes both colors and shapes may still be effectively tracked.

According to at least one example, a computer-implemented method of motion capture is provided that includes tracking motion of an object across a plurality of video images, the object bearing a pattern having a first portion and a second portion. The first portion includes a first shape and a first color and the second portion includes a second shape and a second color. The pattern is configured such that the first portion of the pattern is tracked based on the first shape and the first color and the second portion of the pattern is tracked based on the second shape and the second color. The method further includes causing data representing the motion of the object to be stored to a computer readable medium.

In some embodiments, a system may be provided for performing motion capture. The system includes a memory storing a plurality of instructions and one or more processors. The one or more processors are configurable to: track motion of an object across a plurality of video images, the object bearing a pattern having a first portion and a second portion, the first portion including a first shape and a first color and the second portion including a second shape and a second color, wherein the pattern is configured such that the first portion of the pattern is tracked based on the first shape and the first color and the second portion of the pattern is tracked based on the second shape and the second color; and cause data representing the motion of the object to be stored to a computer readable medium.

In some embodiments, a computer-readable memory storing a plurality of instructions executable by one or more processors may be provided. The plurality of instructions comprise: instructions that cause the one or more processors to track motion of an object across a plurality of video images, the object bearing a pattern having a first portion and a second portion, the first portion including a first shape and a first color and the second portion including a second shape and a second color, wherein the pattern is configured such that the first portion of the pattern is tracked based on the first shape and the first color and the second portion of the pattern is tracked based on the second shape and the second color; and instructions that cause the one or more processors to cause data representing the motion of the object to be stored to a computer readable medium.

In some embodiments, the method, system, and computer-readable memory described above may further include isolating a color channel associated with the first color or the second color, and tracking motion of the object using the isolated color channel.

In some embodiments, tracking the motion of the object includes: determining a position of the first portion of the pattern in a video image; determining a portion of the object corresponding to the first shape and the first color of the first portion; and associating the position with the portion of the object.

In some embodiments, the method, system, and computer-readable memory described above may further include: determining a position of the first portion of the pattern in a video image; determining a portion of a computer-generated object corresponding to the first shape and the first color of the first portion, wherein the computer-generated object is a computer-generated version of the object; and associating the position with the portion of the computer-generated object.

In some embodiments, the method, system, and computer-readable memory described above may further include animating the computer-generated object using the data representing the motion.

In some embodiments, the pattern includes a plurality of non-uniform varying shapes.

In some embodiments, the pattern is part of a support structure worn by the object.

According to at least one example, a motion capture bodysuit is provided. The motion capture bodysuit includes a multi-channel pattern having a first portion and a second portion. The first portion includes a first shape and a first color and the second portion includes a second shape and a second color. The pattern is configured such that the first portion of the pattern is tracked based on the first shape and the first color and the second portion of the pattern is tracked based on the second shape and the second color.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

DETAILED DESCRIPTION

Figure 1:
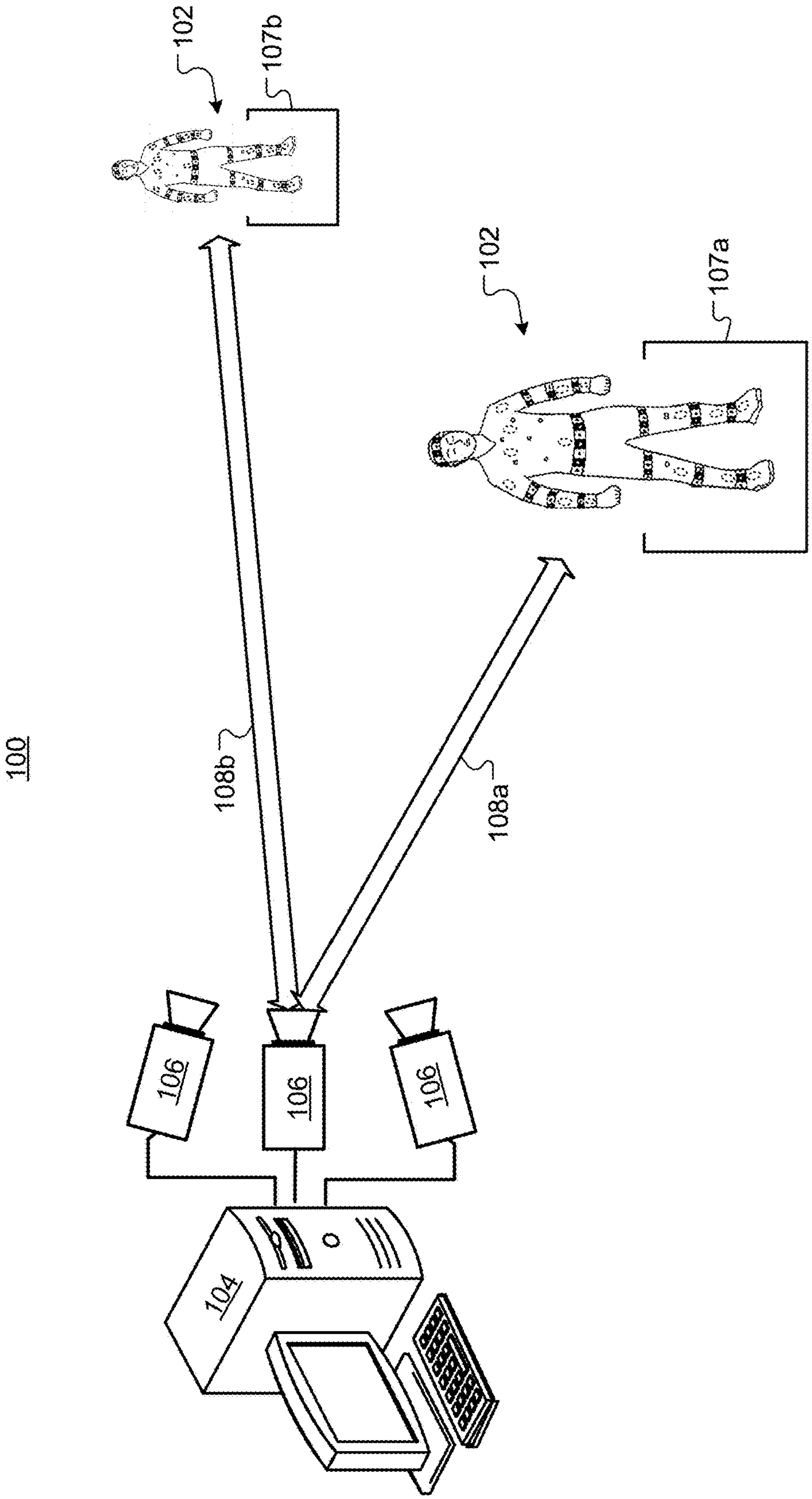
FIG. 1 is a schematic diagram of an example motion capture system.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Motion capture can be performed to generate motion data based on tracking and recording the movement of an object during an action sequence. The captured motion data can be used to animate a computer-generated representation of the object (e.g., an animated object representing the object). A pattern can be used to aid a motion capture system to track movement of the object during the action sequence. In some examples provided herein, a multi-channel tracking pattern is provided that allows motion tracking to be performed. The multi-channel tracking pattern includes various portions, with each respective portion including one or more shapes having different colors. The shapes and colors allow a motion capture system to track motion of an object bearing the pattern across a plurality of video frames. The pattern can take the form of makeup, a support structure (e.g., a bodysuit and/or a set of bands), or other articles worn by the object. A motion capture system is also referred to herein as a tracking system.

The multi-channel tracking pattern allows a motion capture system to efficiently and effectively perform object tracking. In some embodiments, the pattern is track-able over multiple different channels (e.g., over multiple color channels and/or multiple shape channels). For example, a color channel can be isolated for a color on the multi-channel tracking pattern. By isolating the color channel of the color, a motion capture system can identify the color in the presence of imperfections in an image of a video sequence (a series of images) capturing the action sequence performed by the object. Imperfections in an image may include motion blur or other image imperfection. The isolated color can be used to identify the different positions of a portion of the object being tracked as the portion moves to different locations across images of the video sequence. Because the pattern is designed to be tracked over multiple different channels, a motion capture system can efficiently and effectively determine the position of an object in a video sequence that exhibits motion blur or other imperfection in one or more images of the video sequence. For example, motion blur in an image may make it difficult for certain shapes of a pattern to be detected, but may not affect the track-ability of the colors of the pattern. A target bearing a pattern that includes both colors and shapes may thus still be effectively tracked.

FIG. 1 is a schematic diagram of an example motion capture system 100. In the system 100, an object or target may bear a multi-channel pattern that is track-able by a motion capture device 104. An example of an object or target is an actor 102. The actor 102 shown in FIG. 1 is a human actor. One of ordinary skill in the art will appreciate that other types of objects or targets can be tracked by the motion capture device 104. For example, animals, robots, vehicles, plants, or stationary targets may be tracked.

The multi-channel pattern may be comprised of a plurality of marks, which can be applied in one or more ways. For example, and without limitation, one or more marks of the pattern can be located on one or more support structures, tattoos, makeup, or other devices or structures worn by the actor 102. The marks may be a set of colored shapes or symbols that are track-able even if the images of a captured video exhibit motion blur or other video imperfection that makes it difficult to perform object tracking. In some embodiments, the marks can comprise of or be made of high-contrast materials, and may also optionally be lit with conventional lights, light emitting diodes (LEDs), reflective materials, or luminescent materials that are visible in the dark. These lighting qualities can enable cameras 106 to capture the marks of the multi-channel pattern on the object in low lighting or substantially dark conditions. For example, an actor 102 being filmed may walk from a well-lit area to a shadowed area. The marks may be captured despite the actor's 102 movement into the shadowed area because the marks glow or emit light.

Figure 3:
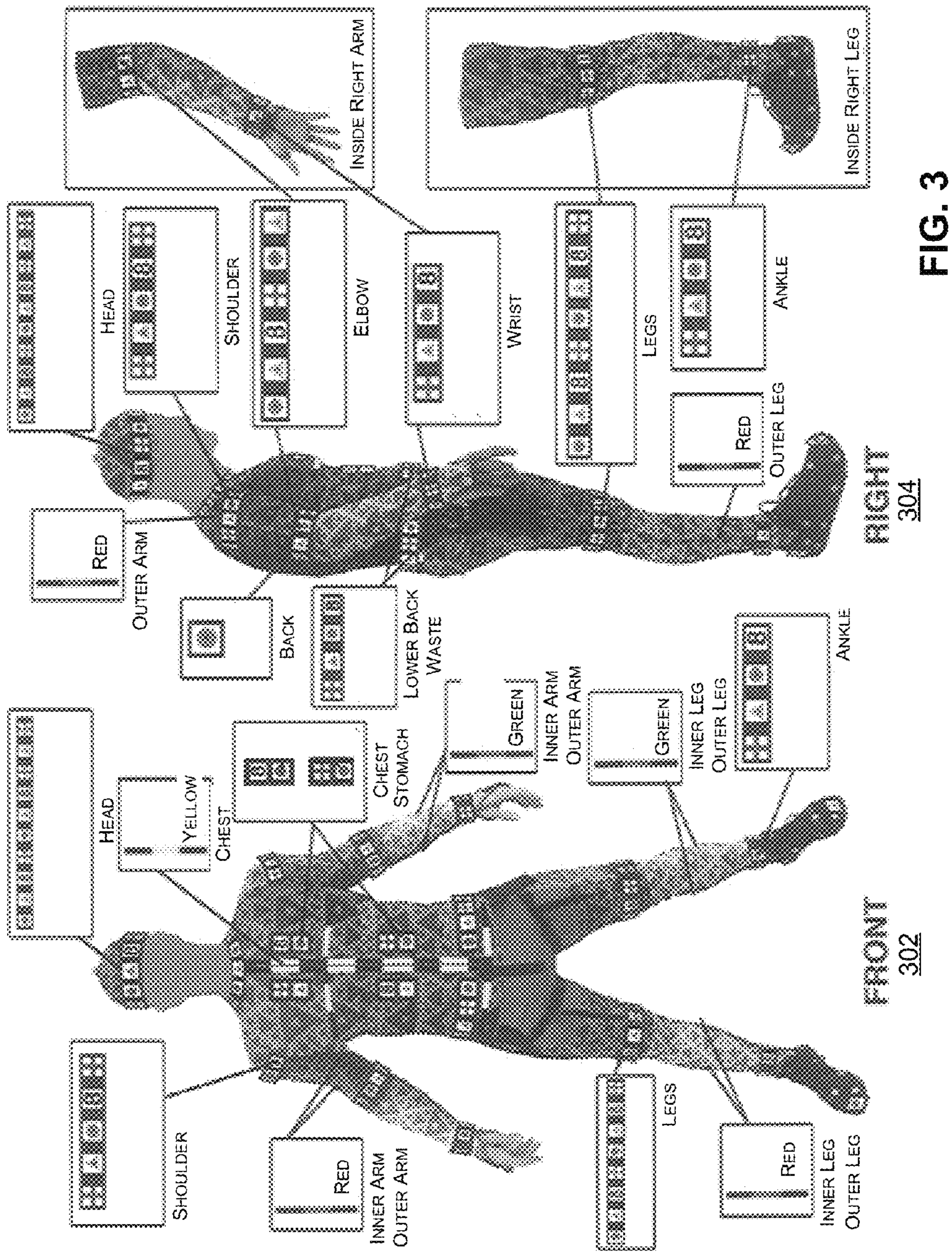
FIG. 3 illustrates an example of a motion capture bodysuit with a pattern for multi-channel tracking from first and second perspectives.
Figure 4:
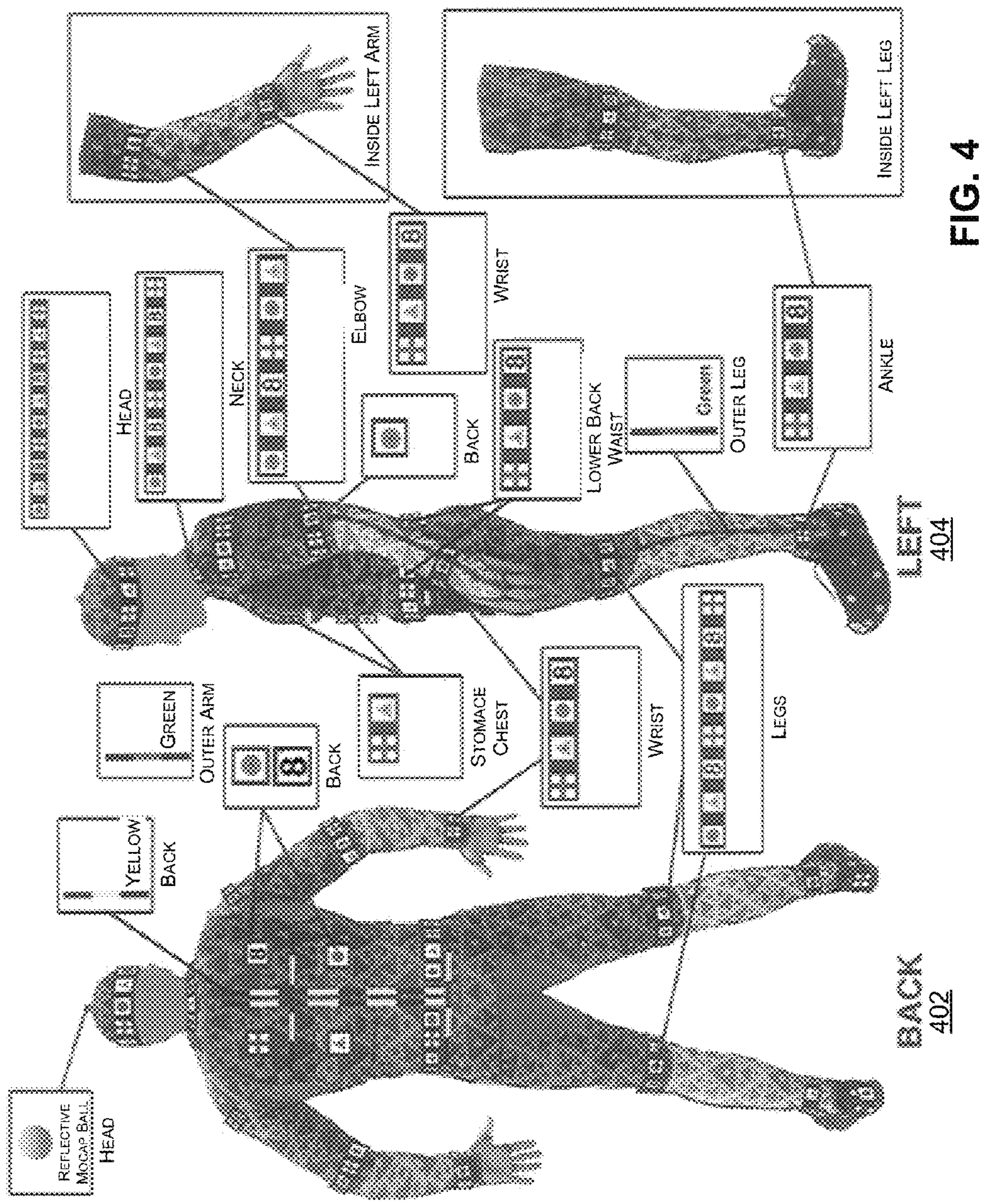
FIG. 4 illustrates an example of the motion capture bodysuit with the pattern for multi-channel tracking from third and fourth perspectives.
Figure 5:
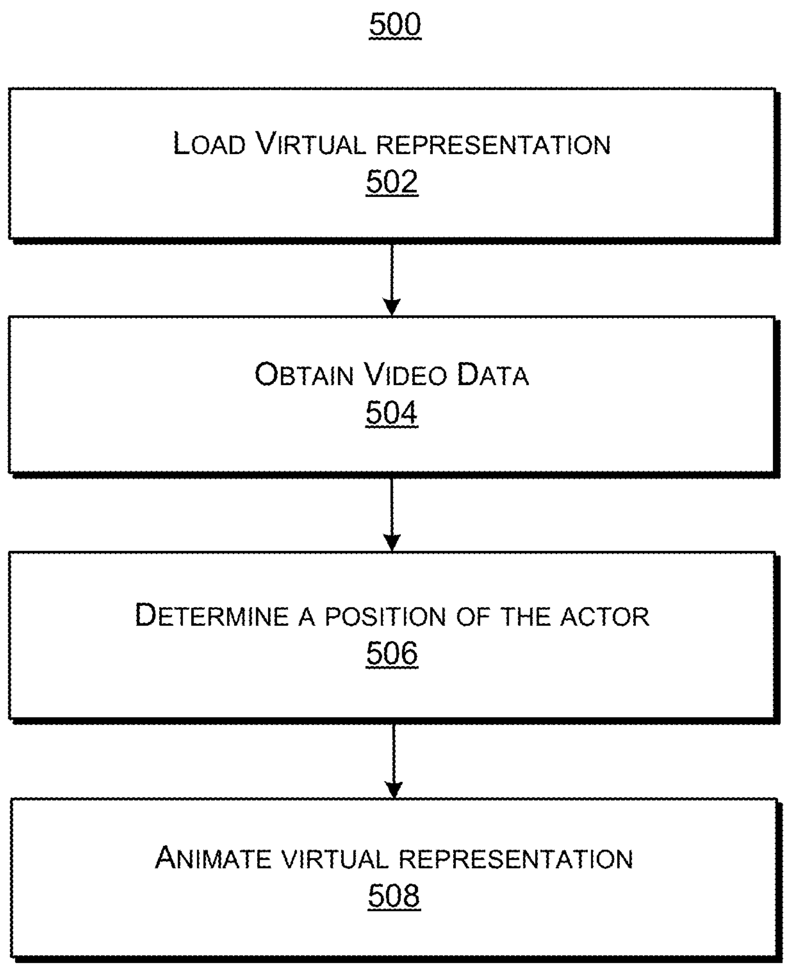
FIG. 5 is a flow chart illustrating a process for animating a virtual representation of an object.

In one embodiment, one or more marks of the multi-channel pattern may be attached to a support structure worn by the actor 102. One example of a support structure can include a body suit worn by the actor 102 (an example of which is shown in FIG. 3 and FIG. 4, discussed below). The support structure may include a rigid portion and/or a semi-rigid portion. Movement of marks on the rigid portion is negligible relative to the marks' positions from each other. Movement of marks on the semi-rigid portion relative to other marks on the same semi-rigid portion is permitted, but the movement is substantially limited within a predetermined range. The amount of the movement between the marks may be based on several factors, such as the type of material used in the portion of the support structure (e.g., a rigid or semi-rigid portion) bearing the marks and the amount of force applied to the portion of the support structure. For example, a flexible cloth, depending on materials used and methods of construction, may qualify as a "rigid" or a "semi-rigid" portion of the support structure in the context of the disclosed techniques, provided that the flexible cloth demonstrates the appropriate level of rigidity. Additionally, bands overlain on top of the flexible cloth may also qualify as the rigid or semi-rigid support structure. In some embodiments, the mark-to-mark spacing on a support structure may be known or may be determinable (and thus does not need to be known a-priori), as discussed in more detail below.

The system 100 can use one or more cameras (e.g., cameras 106) to track different colored marks of the multi-channel pattern attached to the support structure. These marks may be used to estimate the motion (e.g., position and orientation in 3D space through time) of the actor 102. The knowledge that each portion of the support structure is rigid (or semi-rigid) may be used in the estimation process discussed below and may facilitate reconstruction of the actor's 102 motion from a single camera or from multiple cameras. The one or more cameras used to track the marks of the multi-channel pattern can include one or more moving cameras and/or one or more stationary cameras.

The motion capture device 104 collects motion information based on its tracking of the multi-channel pattern applied to the actor 102. For example, cameras 106 can be used to capture images (e.g., from different perspectives or view points) of the actor's 102 body or face and provide data that represents the imagery to the motion capture device 104. The data can include one or more video images or frames. Shown in FIG. 1 are three cameras 106 for recording the actor 102, but it will be understood that more or fewer cameras 106 are possible. The actor 102 may move in the field of view of the cameras 106 in a performance area or stage (e.g., performance areas 107*a* or 107*b*). Movements of the actor 102 may include moving toward or away from a camera, moving laterally or transversely relative to the camera, moving vertically relative to the camera, or any other movement the actor 102 can perform.

Provided with the captured imagery from the cameras 106, the motion capture device 104 can calculate the position of the actor 102 over time. Specifically, the motion capture device 104 computes the position of the actor 102 based on (1) the known location and properties of the cameras 106 (e.g., a camera's field of view, lens distortion, and orientation) and (2) the calculated positions of the different shapes and colors of the multi-channel pattern on the support structure worn by the actor 102 within the captured imagery. The calculated position of the actor 102 may thereafter be used, for example, to move and/or animate a virtual representation (also referred to as a computer-generated representation) of the actor 102 (e.g., a digital double, a virtual character corresponding to the actor, or other suitable computer). For example, the calculated positions may be used to move a virtual creature (corresponding to the actor 102) in a virtual 3D environment to match the movements of the actor 102. Such movement and/or animation of the virtual representation may be used in generating content (e.g., films, games, television shows, or the like).

In some embodiments, some track-able portions of the multi-channel pattern may become untrack-able by the motion capture device 104 over time, and some untrack-able portions of the pattern may become track-able over time. When this happens, vertices may be added or removed from the virtual representation. In some implementations, existing mesh vertices associated with a portion of the pattern that becomes untrack-able may merge with a nearby vertex, be given position values based on interpolations of surrounding vertices, or handled in other ways.

Figure 2:
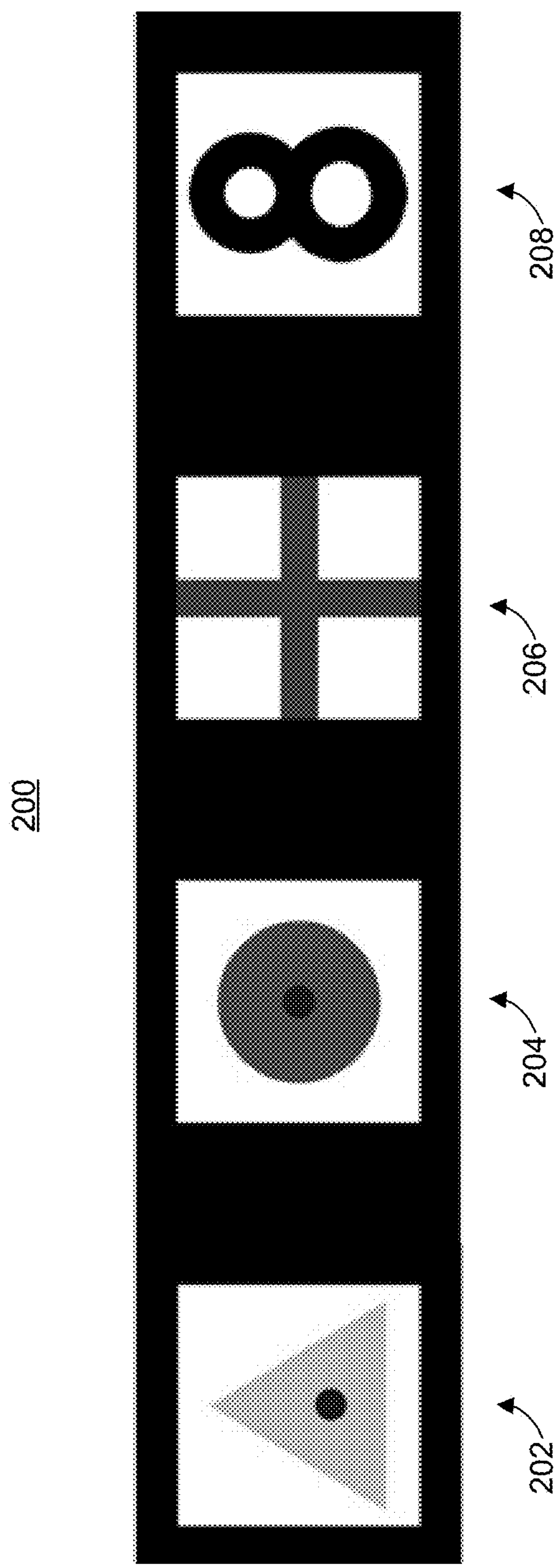
FIG. 2 illustrates an example of a portion of a multi-channel tracking pattern with different marks.

FIG. 2 shows an example of a portion of a multi-channel tracking pattern 200 with different marks. In some implementations, the marks of a multi-channel pattern may include different shapes, and each mark can include one or multiple shapes. For example, the marks 202, 204, 206, 208 of the multi-channel pattern 200 include different shapes. In one embodiment, the mark 202 includes a triangle with an inner dot within a square, the mark 204 includes a circle with an inner dot within a square, the mark 206 includes a cross within a square, and the mark 208 includes an infinity symbol (or a "FIG. 8") within a square. In some embodiments, the multi-channel pattern 200 may also include a set of horizontal bars and/or vertical bars (discussed further below with respect to FIG. 3 and FIG. 4).

In some implementations, the marks of a multi-channel pattern can include or exhibit different colors. For example, a pattern may include a single color, at least two different colors, at least three different colors, or other suitable amount of colors. In one embodiment, a pattern may include red, green, and blue colors. In another example, a pattern may include red, green, blue, and black colors. In yet another example, a pattern may include gray, black, white, green, blue, red, and/or yellow colors. One of ordinary skill in the art will appreciate that any other suitable color can be included in the marks of a multi-channel pattern. In some embodiments, each shape may be associated with one or more different colors. For example, as shown in FIG. 2, the cross within the square of mark 206 may have a blue color, the infinity symbol (or "FIG. 8") within the square of mark 208 may have a black color, the triangle within the square of mark 202 may have a green color (the inner dot may be black in color), and the circle within the square may have a red color (the inner dot may be black in color). One or more horizontal or vertical bars may have a black, red, green, or yellow color (as shown in FIG. 3 and FIG. 4).

A motion tracking system (e.g., motion tracking system 100) can track an object (e.g., actor 102) bearing a multi-channel pattern (e.g., pattern 200) based on multiple separate channels. The channels can include one or more color type channels (or color channels) and one or more shape type channels (or shape channels). For example, the motion tracking system can track an object based on multiple different shapes, where each unique shape comprises a particular shape channel. The motion tracking system can also track the object based on one or more different colors, where each unique color (or combination of colors) can be associated with a particular color channel. For example, a red color channel can correspond to a red color so that isolation of the red color channel allows only red colors to be portrayed in video data. Further details are provided below. In some examples, a red-green-blue color space can be used to isolate different color channels. In some examples, a cyan-magenta-yellow-black (CMYK) color space can be used to isolate different color channels. One of ordinary skill in the art will appreciate that any suitable color space that allows isolation of colors can be used.

Based on portions of a body suit with different shapes and different colors associated with the shapes, the motion tracking system may efficiently identify positions of the portions of the body suit (and thus an actor wearing the body suit) at any given point in time. In one example, the portions of the body suit may correspond to different portions of the actor. For instance, in some embodiments, different parts of an actor's body may bear different sets of shape marks arranged in different sequences. For example, the right wrist of the actor may bear a set of shapes that includes (from right to left): a red circle with an inner black dot in a white square, a blue cross in a white square, a black infinity symbol (or FIG. 8) in a white square, and a green triangle with an inner black dot in a white square. The left wrist of the actor may bear a set of shapes that includes: a blue cross in a white square, a red circle with an inner block dot in a white square, a green triangle with an inner black dot in a white square, and a second red circle with an inner black dot in a white square. In some embodiments, the shapes and corresponding colors may be attached to a set of bands. The bands may be overlain on top of a "fractal" pattern printed to a flexible cloth worn by the actor. The fractal pattern may enable the tracking of an actor across multiple resolutions.

The sequence of shapes and colors on different portions of the multi-channel pattern allows a motion tracking system that is tracking the pattern to more easily track the actor and map certain portions of the actor to a 3D virtual representation for animation purposes. For example, the position information may be mapped to corresponding positions on a virtual 3D representation (or computer-generated representation) of the actor, and used to animate the virtual 3D representation in a virtual environment.

FIG. 3 shows an example motion capture bodysuit 300 with a multi-channel pattern. The motion capture bodysuit 300 is an example of a support structure. The motion capture bodysuit 300 is shown in FIG. 3 from a first front perspective 302 and second right side perspective 304. FIG. 4 shows the example motion capture bodysuit 300 with the same multi-channel pattern from different perspectives. The motion capture bodysuit 300 is shown in FIG. 4 from a third back perspective 402 and fourth left side perspective 404. The bodysuit 300 may be worn, for example, by a performance actor being motion tracked by a motion capture system to generate motion data used for animation.

In one embodiment, as shown in FIG. 3 and FIG. 4, the bodysuit 300 may include flexible cloth that includes a fractal pattern. The bodysuit 300 may further include a cap or hat that includes a reflective motion capture ball or sphere. The reflective motion capture ball may be tracked to aid in the determination of an actor's position. In one embodiment, the bodysuit 300 may include a pair of shoes. The shoes may include a set of reflective dot marks. The shoes may also include one or more marks including shapes of various colors. For example, the left shoe shown in FIG. 3 and FIG. 4 may include a green triangle with a black inner dot on the front of the shoe and a FIG. 8 (or infinity symbol) on the back of the shoe. The right shoe may include a red circle with a black inner dot on the front of the shoe and a blue cross on the back of the shoe.

The bodysuit 300 can be manufactured from a variety of materials including, but not limited to, spandex, cotton, rubber, wood, metal, or nylon. The materials may be cut and formed into the shape of a bodysuit, for example by sewing and/or heat-fusing pieces together, or by performing other methods for cutting and forming materials into a garment.

As shown in FIG. 3 and FIG. 4, the multi-channel pattern on the bodysuit 300 includes a variety of different colored shapes that are unique to certain portions of the bodysuit 300. For example, the bodysuit 300 includes triangles, circles, infinity symbols (FIG. 8 symbols), and crosses of different colors. The colors and shapes can be non-uniform (or non-repeating) and varying across the suit in order to uniquely identify the different portions of the suit. In certain embodiments, the bodysuit 300 may include a set of bands (e.g., ring-like structures that surround and/or attach to portions of an actor's body, such as arm bands, belts, etc.). In one embodiment, a portion of the multi-channel pattern may be printed on or otherwise attached to the set of bands. In one embodiment, the aforementioned shapes are limited to the bands and/or shoes of the bodysuit 300. In one embodiment, the bodysuit 300 also includes a series of horizontal and vertical bars. In various examples, one or more bars on the bodysuit 300 can be in a horizontal direction, in a vertical direction, and/or diagonally oriented relative to a ground plane. The bars may comprise of multiple different colors, with each bar including a single color or multiple colors. For example, as shown in FIGS. 3 and 4, the back and front sides of the bodysuit 300 may each include a series of horizontal and vertical bars that alternate in yellow and black colors. The left side of the bodysuit 300 may include substantially vertical green bars running along the left sleeve and left pant leg of the bodysuit 300. The right side of the bodysuit 300 may include substantially vertical red bars running along the right sleeve and right pant leg of the bodysuit 300. In one embodiment, the color of the bodysuit 300 may include at least four different colored shapes. In some embodiments, the colored shapes may appear in certain unique sequences to better allow a system to enable more accurate tracking. In one embodiment, the bodysuit 300 may be used, for example, when those portions of the actor's body are to be represented or replaced in an item of content with a virtual representation of the actor.

Figure 6:
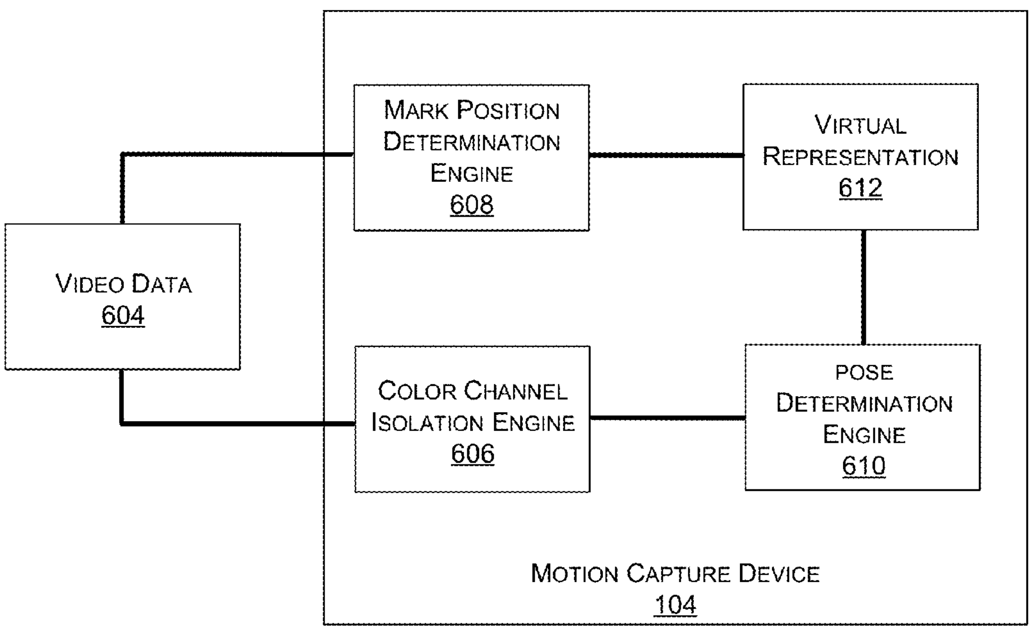
FIG. 6 shows an example of a motion capture device.

In one embodiment, a suitable system may perform a process 500 for tracking an actor or other object based on a multi-channel pattern. For the purposes of this description, the motion tracking system 100 shown in FIG. 1 may perform the process 500. The motion capture device 104 can perform one or more of the steps of the process 500. FIG. 6 illustrates an example of the motion capture device 104 in more detail.

To allow the motion capture device 104 to capture motion of the actor 102, for example, the actor 102 can wear or otherwise bear a multi-channel pattern (e.g., the bodysuit 300 with the multi-channel pattern shown in FIG. 3 and FIG. 4). At step 502, a virtual representation 612 of the actual multi-channel pattern worn by the actor is loaded by the mark position determination engine 608. The virtual representation 612 can also include a virtual representation of a 3D character mapped to the multi-channel pattern. The 3D character can include a creature, a digital double of the actor, or other computer-generated representation of the actor or other object that is animated based on the actions of the actor. The multi-channel pattern may be comprised of marks that include properties across a set of shape channels and also across a set of color channels. For example, the multi-channel pattern can include the multi-channel pattern shown in FIG. 3 and FIG. 4. Mappings between the virtual representation 612 and the multi-channel pattern may also be loaded. Properties for the multi-channel pattern and/or the support structure (e.g., bodysuit) to which the multi-channel pattern is attached may also be loaded. Such properties may include the distance between the marks, the rigidity of the structure, the geometry of the structure, or other property. By loading the virtual representation 612, the mappings, and the property information into the system, the system can determine the location of the actor by matching the virtual representation 612 of the pattern and/or 3D character to images of the actual multi-channel pattern recorded by the motion capture device 104 and cameras 106.

As a specific example, one or more marks of the multi-channel pattern may be attached to a band of a bodysuit that surrounds a portion of the actor 102, such as the actor's 102 left arm. The band can be ring shaped and can occupy a 3D space defined by X, Y, and Z axes. The marks may be arranged in a particular sequence (e.g., a color sequence, a shape sequence, and/or a color and shape sequence) that corresponds to the actor's 102 left arm. In one aspect, the point in the object space of the band where the values on the X, Y, and Z axes meet (e.g., X=Y=Z=0) may be considered the geometric center of the band. In some embodiments, this geometric center may be substantially aligned with and mapped to a geometric center of a portion of the virtual representation loaded by the system (e.g., corresponding to a geometric center of a left arm portion of the virtual representation of the multi-channel pattern and/or of a 3D character mapped to the multi-channel pattern). In other embodiments, the geometric center of the portion of the virtual representation may be offset relative to the geometric center of the band.

At step 504, the motion capture device 104 can obtain video data 604 that includes a sequence of video images of the actor 102. The cameras 106 can capture and record the sequence of video images as the actor performs in a performance area or stage. At step 506, the motion capture device 104 determines the position of the actor 102 based on (i) the loaded virtual representation 612, the mappings, and the property information; and (ii) the set of shapes and/or set of colors of the multi-channel pattern captured in the images recorded by the cameras 106. The virtual representation 612 may then be moved and/or animated at step 508 based on the determined position of the actor 102. The animation may be used to facilitate the generation of an item of content (e.g., a movie, game, television show, or other media content).

In some examples of determining a position of the actor 102, a mark position determination engine 608 of the motion capture device 104 calculates mark positions of various marks on the multi-channel pattern. In some implementations, the motion capture device 104 can calculate one or more ray traces extending from one or more of the cameras 106 through one or more of the marks of the multi-channel pattern in the captured video images of the video sequence. For example, a ray trace can be projected from a nodal point of a camera through the geometric center of a mark on the multi-channel pattern. Each ray trace is used to determine a three-dimensional (3D) position of a point (representing a position of the mark) relative to the camera position, with the camera position being known. Triangulation or trilateration can be used to find the position of the point. For example, triangulation or trilateration can be performed to determine a position of a mark using ray traces from two known camera positions to an unknown point of the mark. In another example, triangulation or trilateration can be performed to determine a position of a mark using a ray trace from a single camera and a known distance between the mark and another mark. In one implementation, the motion capture device 104 may calculate at least two ray traces from a camera view. The two ray traces may extend from a single camera view to a first recorded mark and a second recorded mark, respectively. In one example, the first recorded mark and the second recorded mark may have different colors and shapes. In some examples, the mark position determination engine 608 can calculate a location of a geometric center of a band having one or more marks, rather than a position of one or more of the marks on the band.

In some embodiments, two or more cameras may record multiple observations of the same mark in the multi-channel pattern. The mark position determination engine 608 may use every additional recording of a mark's position as an additional constraint in the position solving calculation. If no marks on a support structure are captured by a camera, observations of marks on other bands or on the clothing layer can be used to estimate the position of the uncaptured marks, or at least to constrain the uncaptured marks to a particular region of space. In some cases where the position of a mark cannot be used to estimate the motion (e.g. some parts are not observed by any camera), one or more physical properties of the object, such as the natural limits of the range of motion for an actor's leg, can be used to infer the most likely position of the mark.

The mark position determination engine 608 can output mark positions for one or more marks of the multi-channel pattern (or a combination of marks uniquely identifying a portion of the pattern) to a pose determination engine 610. The pose determination engine 610 can identify the portion of the virtual representation 612 that corresponds to a particular mark based on the unique shape combination and/or color combination of the mark. For example, the pose determination engine 610 may be able to identify that the mark corresponds to the actor's right forearm based only on the shape combination, only on the color combination, or based on both the shape and color combination.

In some cases, the movements of an object and/or the focal length of one or more cameras may cause imperfections to occur in the video images recorded by the cameras. For example, motion blur can occur when a camera moves at a different pace than an object (e.g., actor 102) is moving across the frame, which causes streaking to occur in the frame or image. The shapes and/or colors of the multi-channel pattern can get lost in the blur, becoming unidentifiable by the motion capture device 104. However, because the pattern is tracked based on both color channels and shape channels, the motion capture device 104 can accurately determine the position of the marks on the actor 102.

In some examples, in the event a particular shape or pattern cannot be identified in an image due to an imperfection such as motion blur, a color channel associated with a color of the shape or pattern can be isolated by a color channel isolation engine 606. In one illustrative example, a portion of a multi-tracking pattern can be located on an actor's right wrist. The portion can include a band with the marks 202, 204, 206, and 208 shown in FIG. 2, including the mark 202 having a green triangle with an inner dot within a square, the mark 204 having a red circle with an inner dot within a square, the mark 206 having a blue cross within a square, and the mark 208 having a black infinity symbol (or a "FIG. 8") within a square. When tracking the actor's right wrist, the motion capture device 104 can attempt to identify the shape combination and/or color combinations of the marks 202, 204, 206, 208. For example, the motion capture device 104 may be able to identify that the portion including the marks 202, 204, 206, 208 corresponds to the actor's wrist based only on the shape combination, only on the color combination, or based on both the shape and color combination. In the event motion blur occurs and one or more of the shapes are unidentifiable in one or more video images, the color channel isolation engine 606 can isolate a color channel from a video image. For example, the color channel isolation engine 606 can obtain a video image from video data 604, and can isolate the green color channel in an RGB color space to isolate the green color of mark 202. Isolating only the green color channel allows the motion capture device 104 to effectively identify the green color in the blurred image. In some examples, the motion capture device 104 can further isolate the red color channel and/or the blue color channel of the RGB color space in order to positively identify the red and blue colors of the marks 204 and 206, respectively. The pose determination engine 610 can then determine that the color pattern corresponds to the portion associated with the actor's right wrist. In some examples, based on a color identified using an isolated color channel, the motion capture device 104 can determine that the color corresponds to a particular shape, and can then determine that the shape corresponds to a certain portion of the actor 101 and/or the multi-channel pattern.

The color channel isolation engine 606 can use any suitable technique for isolating (or separating) one or more color channels. In one illustrative example, a red-green-blue (RGB) color space can be used to isolate different color channels. For example, pixels in an image with high levels of a particular color (e.g., a red color) can be isolated from the other pixels in the image. In some examples, a pixel can be represented as an integer or other number having a number of bits (e.g., a three byte integer, a four byte integer, or other suitable number). The value of the bits defines the color. For example, a 24 or 32 bit integer with three or four bytes, respectively, can represent a pixel, with each byte representing a particular color in the color space (e.g., based on a color range for each byte from 0 to 255). The respective values of each of the bytes define the color that is presented. In one example using a three byte integer, a first byte can represent a red color, a second byte can represent a green color, and a third byte can represent a blue color. A four byte integer can also be used, with one of the bytes also representing the alpha color (e.g., in the first byte or the last byte) in addition to the red, green, and blue colors. Any other suitable arrangement of the bytes being associated with the different color can be used. A pixel having values in the first byte (red color), but no values or a small number of values in the second byte (green color) and third byte (blue color) can be considered a pixel having a red color. In some examples, isolation of a particular color can be based on a color threshold value for the particular color. For example, a pixel having a color value (e.g., a red color byte value) that is greater than a color threshold for a particular color can be considered to be a pixel having the particular color. In one instance, a pixel with red color values that exceed a red color threshold can be considered a red pixel. Using the three byte integer example above, the values of the first byte (red) and the zero or small values of second byte (green) and third byte (blue) can cause the red color threshold to be exceeded. Any pixels with color values lower than the color threshold are considered to not be of the particular color. The pixels in an image that have a color value greater than the color threshold can be isolated, leaving only pixels with the particular color in the image. In some instances, the isolated color can be presented on a display as white pixels, while the non-isolated colors can be presented as black pixels. A color threshold can be determined for each image, or for a group of images. For example, an image histogram can be used to determine a suitable color threshold. Other color channels other than a red, green, or blue color channel can also be isolated. For example, a yellow channel can be isolated based on a combination of red and green color values. In some examples, a cyan-magenta-yellow-black (CMYK) color space can be used to isolate different color channels. One of ordinary skill in the art will appreciate that any suitable color space that allows isolation of colors can be used, and that any suitable technique for isolating color channels can be used.

Once positions of a mark of the virtual representation 612 (and a corresponding portion of the virtual representation 612) are determined based on a shape combination and/or color combination of the mark (or a position of geometric center of a band having the mark), the positions of the mark can be determined or tracked across multiple video images in order to determine the motion of that mark in the video sequence comprising the video images. For example, the pose determination engine 610 can track the movement of a first portion of the pattern (including a mark or a band having a mark) by determining a position of the first portion in a first image and determining the position of the first portion in a second image, and then so on for the plurality of images. To track movement of the entire actor 102, the pose determination engine 610 can determine point calculations (or positions) for the various marks (or bands including the marks) on the multi-channel suit across the sequence of video images. The point calculations together provide the position of the actor 102 in each video image.

After determining the 3D positions of the different portions of the actor 102, the pose determination engine 610 can then determine a 3D orientation of the virtual representation by aligning the virtual representation 612 with the calculated 3D positions or ray traces. For example, an elbow portion of the virtual representation 612 can aligned with the position determined for the elbow portion of the multi-channel pattern. This alignment may be implemented using any suitable type of solving algorithms that can map the motion of an object to a virtual representation of the object, such as a maximum likelihood estimation function or a Levenberg-Marquardt nonlinear minimization of a heuristic error function.

Although the process 500 is described in terms of a motion capture system, other uses are possible. For example, the process 500 could be used for robotic or autonomous navigation, inventory tracking, machining cell control, data representation, barcode reading, or body-capture based user interfaces (e.g. a video game interface where user inputs are based on body motions or positions).

Figure 7:
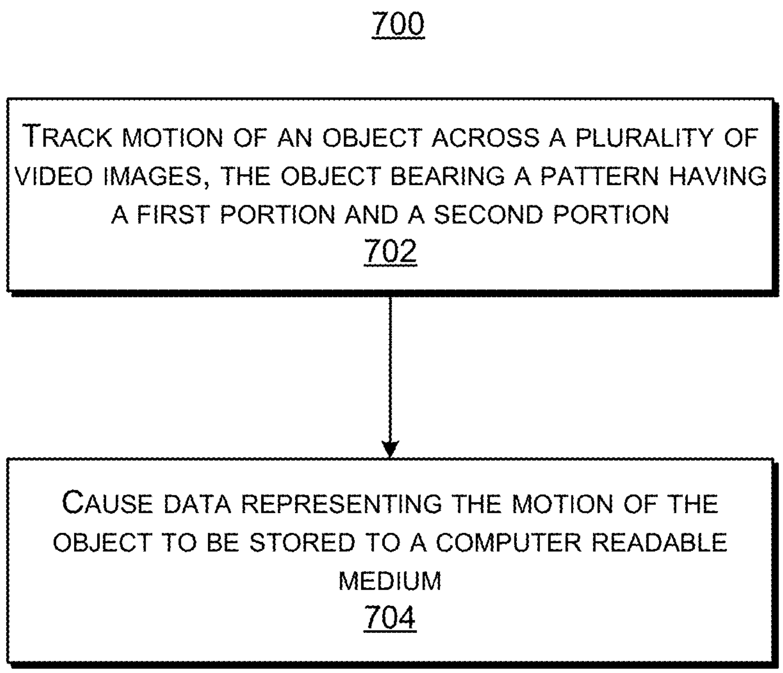
FIG. 7 is a flow chart illustrating a process for performing motion capture.

FIG. 7 illustrates an example of a process 700 of motion capture. Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 700 may be performed by a computing device, such as the motion capture device 104 or the computing system 800 implementing the motion capture device 104.

At 702, the process 700 includes tracking motion of an object across a plurality of video images, the object bearing a pattern having a first portion and a second portion. The first portion includes a first shape and a first color and the second portion includes a second shape and a second color. The pattern is configured such that the first portion of the pattern is tracked based on the first shape and the first color and the second portion of the pattern is tracked based on the second shape and the second color. In some implementations, the pattern can be configured such that the first portion of the pattern is tracked based on the first shape or the first color and the second portion of the pattern is tracked based on the second shape or the second color.

At 704, the process 700 includes causing data representing the motion of the object to be stored to a computer readable medium.

In some embodiments, the process 700 includes isolating a color channel associated with the first color or the second color, and tracking motion of the object using the isolated color channel.

In some embodiments, tracking the motion of the object includes determining a position of the first portion of the pattern in a video image, determining a portion of the object corresponding to the first shape and the first color of the first portion, and associating the position with the portion of the object. By associating the position of the first portion with the portion of the object, the position of the pattern can be used to track motion of the object.

In some embodiments, the process 700 includes determining a position of the first portion of the pattern in a video image and determining a portion of a computer-generated object corresponding to the first shape and the first color of the first portion. The computer-generated object is a computer-generated version of the object, such as a virtual representation of the object. In such embodiments, the process 700 further includes associating the position with the portion of the computer-generated object. By associating the position of the first portion with the portion of the object, the position of the pattern can be used to animate motion of the computer-generated object.

In some embodiments, the process 700 includes animating the computer-generated object using the data representing the motion, as described previously with respect to FIG. 1-FIG. 6.

In some embodiments, the pattern includes a plurality of non-uniform varying shapes. For instance, examples of patterns that can be used in process 700 are shown in FIG. 2-FIG. 4. In some embodiments, the pattern is part of a support structure worn by the object.

Figure 8:
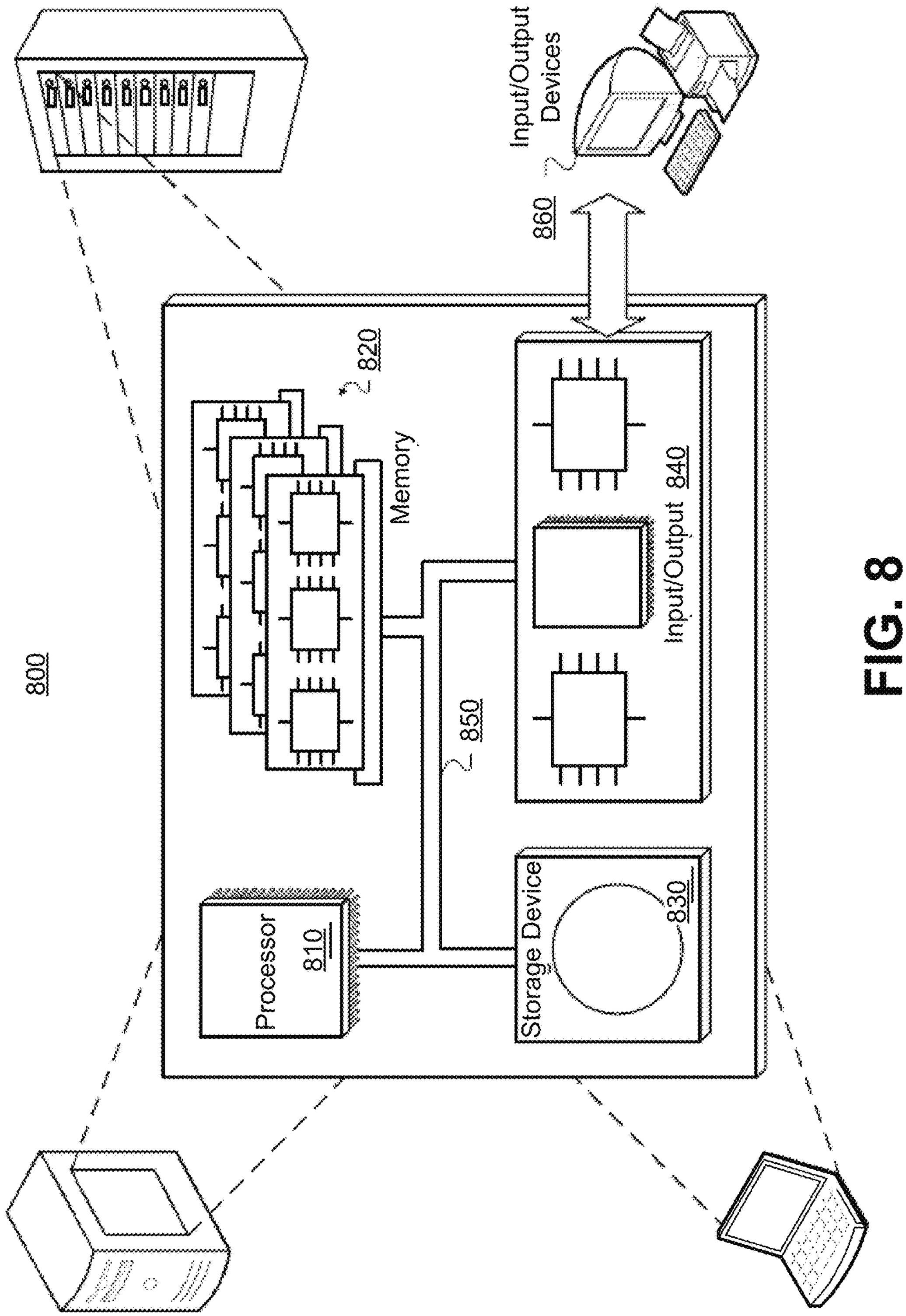
FIG. 8 shows an example of a computing system that can be used in connection with computer-implemented methods and systems described in this document.

FIG. 8 is a schematic diagram that shows an example of a computing system 800. The computing system 800 can be used for some or all of the operations described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840. The memory 820 stores information within the computing system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device. The input/output device 840 provides input/output operations for the computing system 800. In some implementations, the input/output device 840 includes a keyboard and/or pointing device. In some implementations, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits). To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method of motion capture, the method comprising:

tracking motion of an object bearing a multichannel pattern across a plurality of video images based on the multichannel pattern, wherein different portions of the pattern have different configurations of shapes and colors, the different configurations of shapes and colors on the different portions of the multichannel pattern being used to simultaneously track motion of different parts of the object, wherein the multichannel pattern includes a first portion and a second portion, the first portion including a first shape and a first color and the second portion including a second shape and a second color, wherein the multichannel pattern is configured such that the first portion of the pattern is tracked based on the first shape and the first color and the second portion of the multichannel pattern is tracked based on the second shape and the second color;

isolate a color channel associated with the first color or the second color by isolating pixels in the plurality of video images with high levels of the first color or the second color from pixels in the plurality of images;

calculate a ray trace extending from a camera through a first mark and a second mark of the multichannel pattern in the video images, wherein a distance between the first mark and the second mark is known;

triangulate a three-dimensional position of a point representing a position between the first mark and the second mark relative to a position of the camera;

track motion of the object using the isolated color channel, shape identification, and ray-trace triangulation; and causing data representing the motion of the object to be stored to a computer readable medium.

2. The method of claim 1, wherein tracking the motion of the object includes:

determining a position of the first portion of the pattern in a video image;

determining a portion of the object corresponding to the first shape and the first color of the first portion; and associating the position of the first portion of the pattern with the portion of the object.

3. The method of claim 1, further comprising:

determining a position of the first portion of the pattern in a video image;

determining a portion of a computer-generated object corresponding to the first shape and the first color of the first portion, wherein the computer-generated object is a computer-generated version of the object; and associating the position of the first portion of the pattern with the portion of the computer-generated object.

4. The method of claim 3, further comprising:

animating the computer-generated object using the data representing the motion.

5. The method of claim 1, wherein the pattern includes a plurality of non-uniform varying shapes.

6. The method of claim 1, wherein the pattern is part of a support structure worn by the object.

7. A system for performing motion capture, comprising:

a memory storing a plurality of instructions; and one or more processors configurable to:

track motion of an object bearing a multichannel pattern across a plurality of video images based on the multichannel pattern, wherein different portions of the multichannel pattern have different configurations of shapes and colors, the different configurations of shapes and colors on the different portions of the multichannel pattern being used to simultaneously track motion of different parts of the object, wherein the multichannel pattern includes a first portion and a second portion, the first portion including a first shape and a first color and the second portion including a second shape and a second color, wherein the multichannel pattern is configured such that the first portion of the pattern is tracked based on the first shape and the first color and the second portion of the pattern is tracked based on the second shape and the second color;

isolate a color channel associated with the first color or the second color by isolating pixels in the plurality of video images with high levels of the first color or the second color from the pixels in the plurality of images;

calculate a ray trace extending from a camera through a first mark and a second mark of the pattern in the video images, wherein a distance between the first make and the second mark is known;

triangulate a three-dimensional position of a point representing a position of the first mark and second mark relative to a position of the camera;

track motion of the object using the isolated color channel, shape identification, and ray-trace triangulation; and cause data representing the motion of the object to be stored to a computer readable medium.

8. The system of claim 7, wherein tracking the motion of the object includes:

determining a position of the first portion of the pattern in a video image;

determining a portion of the object corresponding to the first shape and the first color of the first portion; and associating the position of the first portion of the pattern with the portion of the object.

9. The system of claim 7, wherein the one or more processors are configurable to:

determine a position of the first portion of the pattern in a video image;

determine a portion of a computer-generated object corresponding to the first shape and the first color of the first portion, wherein the computer-generated object is a computer-generated version of the object; and associate the position of the first portion of the pattern with the portion of the computer-generated object.

10. The system of claim 9, wherein the one or more processors are configurable to:

animate the computer-generated object using the data representing the motion.

11. The system of claim 7, wherein the pattern includes a plurality of non-uniform varying shapes.

12. The system of claim 7, wherein the pattern is part of a support structure worn by the object.

13. A non-transitory computer-readable memory storing a plurality of instructions executable by one or more processors, the plurality of instructions comprising:

instructions that cause the one or more processors to track motion of an object bearing a pattern across a plurality of video images based on the pattern, wherein different portions of the pattern have different configurations of shapes and colors, the different configurations of shapes and colors on the different portions of the pattern being used to simultaneously track motion of different parts of the object, wherein the pattern includes a first portion and a second portion, the first portion including a first shape and a first color and the second portion including a second shape and a second color, wherein the pattern is configured such that the first portion of the pattern is tracked based on the first shape and the first color and the second portion of the pattern is tracked based on the second shape and the second color; and instructions that cause the one or more processors to isolate a color channel associated with the first color or the second color by isolating pixels in the plurality of video images with high levels of the first color or the second color from the pixels in the plurality of images;

instructions that case the one or more processors to calculate a ray trace extending from a camera through a first mark and a second mark of the pattern in the video images, wherein a distance between the first make and the second mark is known;

instructions that case the one or more processors to triangulate a three-dimensional position of a point representing a position of the first mark and second mark relative to a position of the camera;

instructions that cause the one or more processors to track motion of the object using the isolated color channel, shape identification, and ray-trace triangulation; and instructions that cause the one or more processors to cause data representing the motion of the object to be stored to a computer readable medium.

14. The non-transitory computer-readable memory of claim 13, wherein tracking the motion of the object includes:

determining a position of the first portion of the pattern in a video image;

determining a portion of the object corresponding to the first shape and the first color of the first portion; and associating the position of the first portion of the pattern with the portion of the object.

15. The non-transitory computer-readable memory of claim 13, further comprising:

instructions that cause the one or more processors to determine a position of the first portion of the pattern in a video image;

instructions that cause the one or more processors to determine a portion of a computer-generated object corresponding to the first shape and the first color of the first portion, wherein the computer-generated object is a computer-generated version of the object; and instructions that cause the one or more processors to associate the position of the first portion of the pattern with the portion of the computer-generated object.

16. The non-transitory computer-readable memory of claim 15, further comprising:

instructions that cause the one or more processors to animate the computer-generated object using the data representing the motion.

17. The non-transitory computer-readable memory of claim 13, wherein the pattern includes a plurality of non-uniform varying shapes.

18. The system of claim 7, wherein the one or more processors are configurable to:

calculate a location of a geometric center a band having one or more marks.

* * * * *